(12) United States Patent
Krappe et al.

(10) Patent No.: US 9,229,919 B1
(45) Date of Patent: Jan. 5, 2016

(54) RECONCILING SMART FIELDS (75) Inventors: Kirk Krappe, Portola Valley, CA (US); Neehar Giri, Saratoga, CA (US)

(73) Assignee: APTTEX CORPORATION, San Mateo, CA (US)

( * ) Notice: Subject to any disclaimer, the term of this patent is extended or adjusted under 35 U.S.C. 154(b) by 257 days.

(21) Appl. No.: 13/423,282

(22) Filed: Mar. 19, 2012

Related U.S. Application Data (62) Division of application No. 13/423,280, filed on Mar. 19, 2012.

(51) Int. Cl.
*G06F 7/00* (2006.01)
*G06F 17/22* (2006.01)

(52) U.S. Cl.
CPC .................... *G06F 17/2288* (2013.01)

(58) Field of Classification Search
CPC .......... G06F 17/30598; G06F 17/2288; G06F 17/30011; G06F 17/30309
USPC .................... 707/695; 715/228, 700
See application file for complete search history.

(56) References Cited

U.S. PATENT DOCUMENTS

| | | | | |
|---|---|---|---|---|
| 8,028,229 | B2 * | 9/2011 | Bailor et al. | 715/255 |
| 8,352,870 | B2 * | 1/2013 | Bailor et al. | 715/751 |
| 8,515,902 | B2 * | 8/2013 | Savage | 707/608 |
| 2002/0076946 | A1 * | 6/2002 | Kim et al. | 438/785 |
| 2004/0078756 | A1 * | 4/2004 | Napper et al. | 715/507 |
| 2009/0210459 | A1 * | 8/2009 | Nair et al. | 707/203 |
| 2012/0185762 | A1 * | 7/2012 | Ozer et al. | 715/229 |
| 2013/0110797 | A1 * | 5/2013 | Campbell et al. | 707/695 |

OTHER PUBLICATIONS

Herrick, D., Google This! Using Google Apps for Collaboration and Productivity, SIGUCCS'09, Oct. 11-14, 2009, St. Louis, Missouri, USA, pp. 55-63.*
Strickland, J., How Google Docs Works, http://computer.howstuffworks.com/internet/basics/google-docs.htm/printable Nov. 20, 2013, pp. 1-5.*
Google Docs, Wikipedia.com, Nov. 20, 2013, pp. 1-9.*

* cited by examiner

*Primary Examiner* — Cheyne D Ly
(74) *Attorney, Agent, or Firm* — HM Law Group LLP; Vani Moodley, Esq.

(57) ABSTRACT

Managing a plurality of document versions saved in a cloud-based structured database management system. Allowing the user of a document creation application to add intelligence to objects within a document, thereby allowing the user to reconcile changes made to the document during a negotiation lifecycle.

15 Claims, 10 Drawing Sheets

RECONCILING SMART FIELDS

CROSS REFERENCE TO CO-PENDING APPLICATIONS

This application is a divisional of U.S. patent application Ser. No. 13/423,280, filed Mar. 19, 2012, entitled "LINKING STRUCTURED DATABASE MANAGEMENT SYSTEMS WITH DOCUMENT CREATION AND WORD PROCESSING TOOLS," and is related to U.S. patent application Ser. No. 13/423,283, filed Mar. 19, 2012, entitled "SOCIAL MEDIA INTEGRATION AND COLLABORATION TOOLS IN A SYSTEM FOR LINKING STRUCTURED DATABASE MANAGEMENT SYSTEMS WITH DOCUMENT CREATION AND WORD PROCESSING TOOLS," both of which are incorporated herein in their entirety.

BACKGROUND OF THE INVENTION

1. Technical Field

The invention relates to the field of business management. More specifically, the invention relates to using structured data in a document creation application.

2. Description of the Related Art

The increased availability of computer systems and the ability to connect the computer systems using various networks such as intranets and the Internet, for example, has made vast repositories of information and cloud-managed software applications available to a large number of people. In many instances, having such a large amount of information at one's fingertips greatly enhances productivity.

These advances in information accessibility and processing have created other challenges, e.g., how to manage such a large collection of information. Many new tools have been developed to deal with the ever-expanding volume of information that is now available for consumption in an electronic form.

Some approaches to managing vast amounts of information utilize a structured database management system. Indeed, it is highly useful to access a structured database management system and run applications thereon, i.e. applications for managing customer or partner engagement, managing the contract process/lifecycle, and for automatically generating documents.

However, despite the ability to manage business relationships through an application with access to a structured database management system, most business relationships are memorialized using word processing software and managed by manual human analysis.

Co-pending application Ser. No. 13/423,280, filed Mar. 19, 2012, entitled "LINKING STRUCTURED DATABASE MANAGEMENT SYSTEMS WITH DOCUMENT CREATION TOOLS," discusses systems and methods of linking structured database management systems with document creation tools. Some embodiments of the invention involve a computer architecture including an add-in for linking document creation application with a structured database management system.

SUMMARY OF THE INVENTION

In view of the foregoing, the invention provides systems and methods of allowing the user of a document creation and word processing application to manage a plurality of document versions saved in a structured database management system.

Some embodiments of the invention involve adding intelligence to objects within a document, thereby allowing the user to reconcile changes made to the document during a negotiation lifecycle by referencing one or more versions of the document in a structured database management system.

Some embodiments of the invention involve tools for highlighting intelligent objects within a document. Some embodiments of the invention involve tools for restoring deleted intelligent objects within a document. Some embodiments of the invention involve tools for providing feedback relating to intelligent objects to authors and reviewers of a document. Some embodiments of the invention involve tools for testing business management analytics by analyzing one or more document with a reconciliation tool.

DETAILED DESCRIPTION OF THE INVENTION

Systems and methods are provided for utilizing the Web Services Description Language of one or more structured database management system to communicate with a business management application. In some embodiments of the invention, the business management application is accessed using an API call from a document creation and word processing application. In some embodiments of the invention the business management application comprises a business lifecycle management application for creating a quote for a prospect or customer, engaging and negotiating an agreement, order management and invoicing. In the presently preferred embodiments of the invention, a contract creation and contract lifecycle management application accesses a structured database management system via an add-in for a word processing application.

Figure 1:
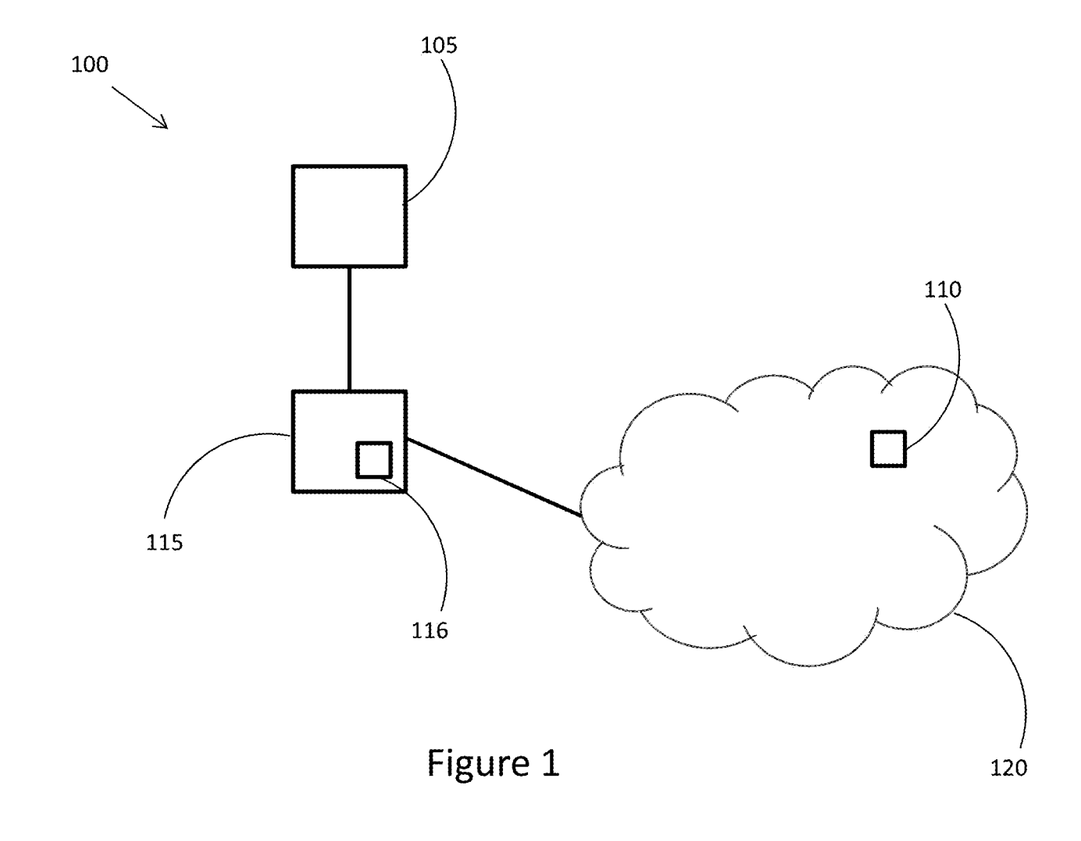
FIG. 1 illustrates an example of architecture for providing a document creation and word processing application with access to business management application according to some embodiments of the invention.

FIG. 1 illustrates an example of architecture 100 for providing a document creation and word processing application 105 with access to business management application 110 according to some embodiments of the invention. According to FIG. 1, the business management application 110 is hosted on a cloud-based structured database management system 120. In some embodiments of the invention, the cloud-based structured database management system 120 comprises a platform-as-a-service offering, such as those offered by Salesforce®, located at One Market Plaza, Suite 300, San Francisco, Calif., 94105, United States. Although a cloud-based structured database management system is explicitly described, those with ordinary skill in the art having the benefit of the disclosure will appreciate that the invention can also be implemented in a behind firewall database management system with the same effectiveness.

According to FIG. 1, the business management application 110 is accessed by the document creation and word processing application 105 through a managed add-in 115 that transfers web service calls to the business management application 110 via the structured database management system 120. Accordingly, a user accesses structured data from the structured database management system 120 as well as the business management application's 110 functionality via the document creation and word processing application 105.

In most cases, the business management application 110 and the structured database management system 120 require log-in credentials. In some cases, the log-in credentials are the same for both the business management application 110 and the structured database management system 120. In the presently preferred embodiment of the invention, a user enters his structured database management system 120 log-in credentials via the document creation and word processing application 105.

In some embodiments of the invention, once the user logs into the document creation and word processing application 105 using his structured database management system 120 credentials, a session identifier is stored within the add-in 115 so that the successive calls can be invoked in the same session context until the user logs out of the system.

In some embodiments of the invention, the add-in 115 is configured to display interactive menus, buttons, text fields, etc. either via windows native to the document creation and word processing application 105, browser-based windows common to the structured database management system 120, or a combination thereof.

In some embodiments of the invention, a browser-based form loads a dynamic interactive page from the business management application 110 in the structured database management system 120. In one illustrative example, a browser-based form loads a dynamic interactive Visualforce® page from a contract lifecycle management product in the Salesforce.com cloud. According to this example, the browser-based form helps the customer to extend or improvise the Visualforce® page according to their organizational needs, thereby enabling zero maintenance on the deployment of the add-in 115 on each of the organization users' desktops.

In some other embodiments of the invention, the add-in 115 is configured to display interactive menus, buttons, text fields, etc. via the document creation and word processing application 105 itself.

According to some embodiments of the invention, business management application 110 comprises a contract management application designed for contract administrators and legal users to help streamline the process of creating and maintaining contracts and associated contract and clause templates. Since these users are familiar with drafting, revising, and negotiating contracts using common word processing software, it is desirable to offer the benefits and functionality of the contract management application from within the native word processing environment. Using the contract management application, contract administrators can manage complex negotiation cycles, clauses, and contract templates easily.

In some embodiments of the invention, the contract management application provides support for versioning of agreements, and contract administrators can save internal, external, and final versions of non-standard language in a the word processing application whether accessed locally or via a browser-based interface for accessing the business management application 110. When saving final versions, the contract management application also helps the user to reconcile any terms that might have changed during the approval process. Contract and clause templates can also be managed, including the ability to insert, save as, and replace them to and from the business management application 110. Additionally, users can compare versions of a contract. In some embodiments of the invention, the contract management application provides also provides support for creating conditional text within a contract or clause template. This allows contract administrators to create sophisticated conditional clauses that can include or exclude certain text or clauses depending on how a conditional expression containing valid agreement related merge fields is evaluated. These and other features are described in more detail below.

In the presently preferred embodiments of the invention, the add-in 115 includes a reconciliation manager 116 comprising a processing module especially configured for performing a method of reconciliation (explained in greater detail below).

Figure 2A:
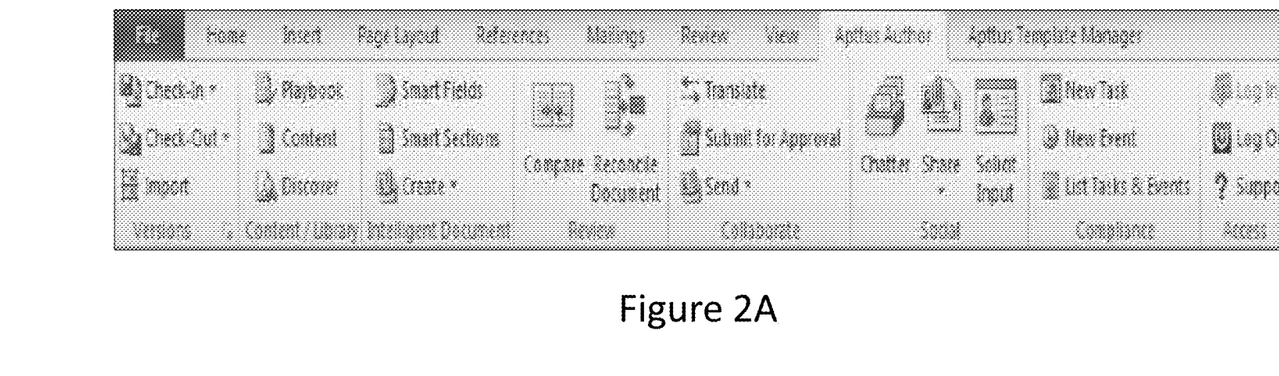
FIG. 2A illustrates an example of an interactive ribbon menu for interacting with the business management application and the structured database management system via a document creation and word processing application according to some embodiments of the invention.

FIG. 2A illustrates an example of an interactive ribbon menu 200 for interacting with the business management application 110 and the structured database management system 120 via a document creation and word processing application 105 according to some embodiments of the invention. According to FIG. 2A, the interactive ribbon menu 200 includes a variety of tools for adding collaborative functionality and lifecycle management utility to a word processing document. In some embodiments of the invention, the interactive ribbon menu 200 provides at least the following utilities: amending and saving contract agreements to the business management application 110; providing the ability to highlight reconcilable data; providing the ability to reconcile agreement records; providing the ability to view social media feeds from within the word processing application; providing the ability to share content and documents via social media; providing the ability to translate a content from one language to another from within the word processing application; providing the ability to create reminder tasks or schedule appointment events in relation to the currently opened agreement document; providing tools for agreement contract versioning; providing the ability to store unique versions of word processing files that are marked with an explicit version number as attachments to the business management application 110, thereby keeping multiple versions of an agreement with a rich history of all changes made to an agreement by all parties; and allowing contract administrators the ability to compare different versions of agreements in a side by side view.

Figure 2B:
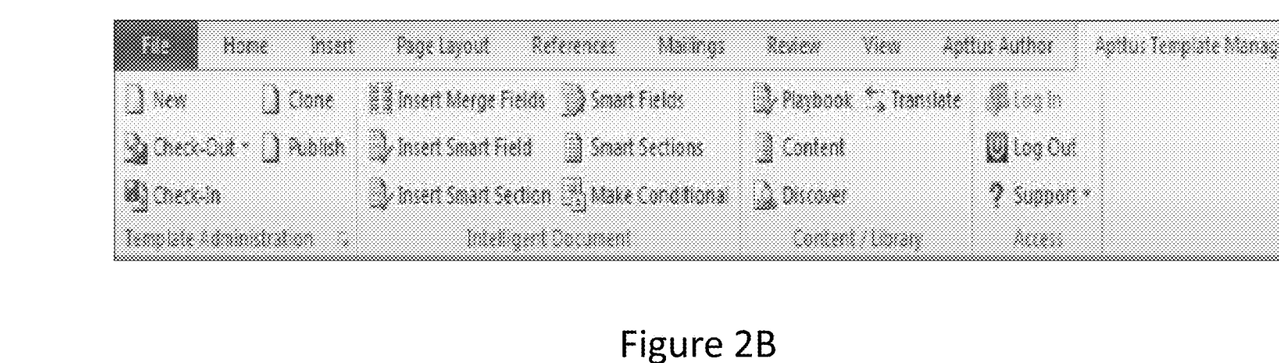
FIG. 2B illustrates an example of an interactive ribbon menu for interacting with the business management application and the structured database management system via a document creation and word processing application according to some embodiments of the invention.

FIG. 2B illustrates an example of an interactive ribbon menu 200 for interacting with the business management application 110 and the structured database management system 120 via a document creation and word processing application 105 according to some embodiments of the invention. According to FIG. 2B, the interactive ribbon menu 200 includes a variety of tools for managing the agreement contract templates related functions for contract administrators by providing at least the following abilities: creating complex contract templates from existing word processing documents or other contract templates from the business management application 110; inserting clauses from clause libraries either as an inline clause or as clause reference which gets resolved during the generation of the contract agreement; inserting conditional clauses or text; inserting merge fields as smart fields which enables reconciliation process; creating new contract templates, check-out an existing contract template and check-in contract template; and translating a clause from one language to another from within the word processing interface.

As explained above, the presently preferred embodiments of the invention involve a contract creation (aka agreement management) and lifecycle management application accessing a cloud-based structured database management system via an add-in for a word processing application. Accordingly, a plurality of tools is presented to the end users to assist with agreement management.

For example, in some embodiments of the invention, agreement management tools allow contract administrators and legal users the ability to save internal, external, or final versions of a contract to the database management system 120, the business management application 110, or both. In some embodiments of the invention, non-standard language can be replaced in a contract using a tool for providing contract version support using a word processing application's existing versioning capability, as well as the ability to store unique versions that are marked with an explicit version number (i.e. Sample Contract_v2_Internal.doc) and stored as attachments in the database management system 120, the business management application 110, or both. Indeed, using these tools allows multiple versions of an agreement to be kept with a rich history of all changes made to an agreement by all parties. Additionally, version management tools allow contract administrators the ability to compare different versions of agreements in a side by side view.

In some embodiments of the invention, one or more of the following agreement management tools are offered to end users:

Save As Internal Version Tool

In some embodiments of the invention, a Save as Internal Version Tool saves an internal ("private") version of the contract in the database management system 120, the business management application 110, or both. The internal version is appropriately marked as "Internal" and optionally contains redlines and all changes to date.

Save As External Version

In some embodiments of the invention, a Save as External Version Tool saves an external ("public") version of the contract in the database management system 120, the business management application 110, or both. The external version is marked as "External" and optionally has all redlines removed. The external version can be safely sent to an external third party for review without concern that the third party might glean confidential or sensitive information from the previous, red-lined versions.

Save As Final Version

In some embodiments of the invention, a Save As Final Version Tool saves a final version of the contract in the database management system 120, the business management application 110, or both. The final version is marked as "External" which has all redlines removed and asks the user to reconcile the contract.

Update Version

In some embodiments of the invention, an Update Version tool updates an existing version of an agreement in the database management system 120, the business management application 110, or both with the current version loaded in the document creation and word processing application 105.

Compare Versions

In some embodiments of the invention, a Compare Version tool compares any two versions of an agreement stored in the database management system 120, the business management application 110, or both with each other and shows differences in a side-by-side view within the document creation and word processing application 105.

Save As Agreement Clause

In some embodiments of the invention, a Save As tool saves selected text to the database management system 120, the business management application 110, or both and creates associated entries in an agreement clause table for the agreement that is being edited.

Workflow

In some embodiments of the invention, one or more of the tools listed herein or disclosed elsewhere perform actions that change the data in the structured database management system 120 itself. By its very nature, business data is sensitive and oftentimes extremely secret. Accordingly, some embodiments of the invention involve security protocols and permission verification check before allowing a user to change the structured data.

Figure 3:
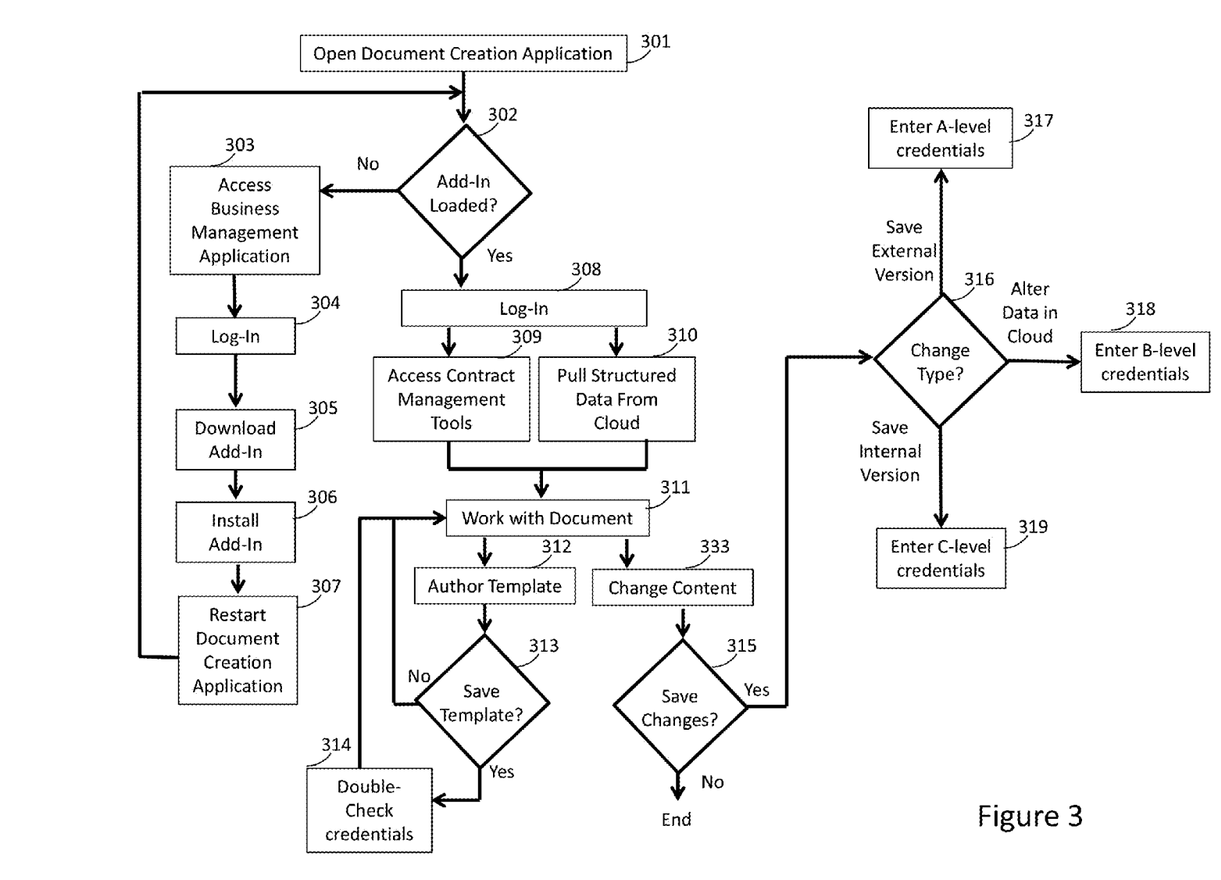
FIG. 3 illustrates a method of contract management by one or more end user via document creation and word processing software according to some embodiments of the invention.

FIG. 3 illustrates a method 300 of contract management by one or more end user via document creation and word processing software according to some embodiments of the invention. The method 300 begins with a user opening the document creation and word processing application 301. Next, a determination 302 is made whether or not the add-in 115 is already loaded. If not, a user can access 303 the business management application 110 directly, log in 304, download the add-in 305, and install the add-in 306. Once the add-in is newly installed, the user restarts 307 the document creation and word processing application 105 to begin using the add-in. If the add-in is already loaded into the document creation and word processing application 105, the method 300 continues by asking the user to log in 308. In some embodiments of the invention, the document creation and word processing application 105 asks a user to log-in when he first attempts to use the add-in ribbon menu.

In some embodiments of the invention, logging in comprises being challenged with a user name and password. In some embodiments of the invention, logging in comprises the user entering a username and password and also using a security token if trying to login outside the company's trusted network. In some embodiments of the invention, the login processes 304, 308 involve entering log in information of the structured database management system 120, the business management application 110, or both. According to these embodiments, once the user clicks on the login button, the add-in invokes a web service call to challenge the user credential in the cloud. Upon validation of the user's credentials, the business management application 110 sends the user back a login success message along with a session id. If login is unsuccessful then it sends in back a fault code for the error.

Once the user is successfully logged in, he may access contract management tools 309 using the add-in 115 via an interface within the document creation and word processing application 105 and pull 310 structured data from the structured database management system 120 cloud, and work with the document 311 using the document creation and word processing application 105.

As will be explained in more detail below, the contract management tools include tools for using existing templates and authoring new templates. In some embodiments of the invention, a button in the ribbon is configured to create agreement templates. The user has an option to either checkout an existing agreement template or author an agreement template from scratch. If the user authors an original template 312, he can choose to save 313 the authored template in the structured database management system 120, the business management application 110, or both. In some embodiments of the invention, if the user chooses to save the template, the add-in double-checks the user's credentials 314 to ensure that he is authorized to save authored templates.

Next, once a user changes 333 the document and is finished working with the document 311, he may choose to save 315 the changes he made to it. As explained above, multiple types of versions of a document can be saved and the user can also check in data changes. Accordingly, in some embodiments of the invention, a determination 316 is made as to what types of changes are being made and various levels 317, 318, 319 are required for each.

Merge Fields

In some embodiments of the invention, the agreement management tools include tools for using merge fields. Once the document is available for amending, the user can insert more content by inserting merge fields, clauses, etc. A merge field is a placeholder for objects, i.e. text, which you insert into a document during the creation and versioning process. According to some embodiments of the invention, the add-in includes tools for automatically inserting structured data from the structured database management system 120 into each merge field. Additionally, the user can format, copy, move, or delete a merge field. In some embodiments of the invention, the business management application 110 add-in 115 uses fields in the document creation and word processing application 105 to insert an object as a merge field in a document. In some embodiments of the invention, the business management application 110 add-in 115 extends the merge field definition to customize merge field signature.

Users can start inserting merge fields by placing the cursor into appropriate sections of the document. Selecting a merge field to insert into a document is context sensitive and also the option to insert fields into a section or table is dependent on how objects are related.

Figure 5A:
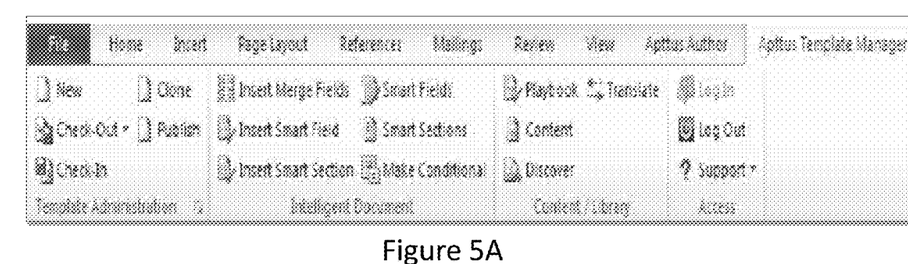
FIG. 5 illustrates the user interface of a reconciliation tool according to some embodiments of the invention.

FIG. 5A illustrates an example of an interactive ribbon menu 500 for inserting merge fields into a document according to some embodiments of the invention. According to some embodiments of the invention, merge fields can be inserted by clicking the menu Insert Merge Fields from the ribbon menu 500.

Figure 5B:
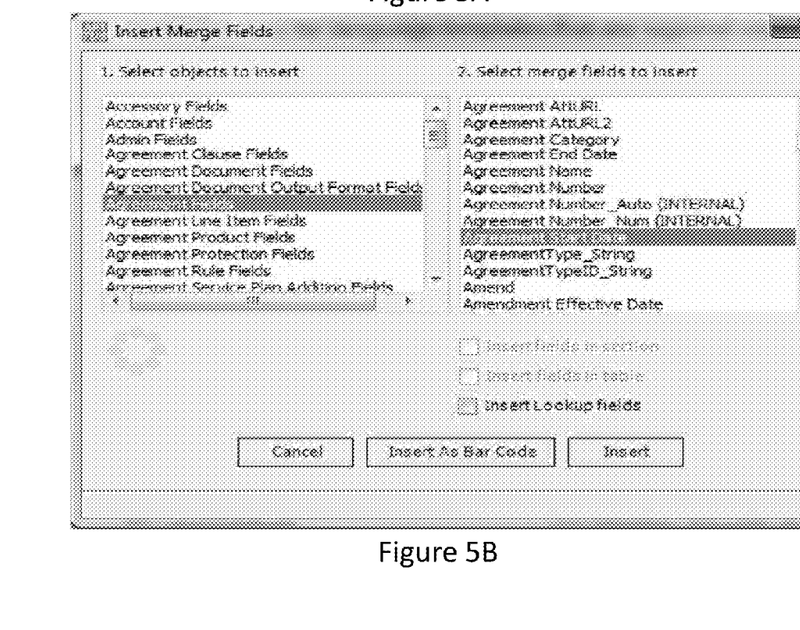

In some embodiments of the invention, merge fields are used to automatically insert legal clauses into contracts and fill the clauses with structured data from a structured database management system. FIG. 5B illustrates an interface for selecting merge fields according to some embodiments of the invention.

Smart Fields

Some attempts have been made to insert structured data into word processing applications; however, these attempts have come up short for a variety of reasons. For example, according to prior attempts, once structured data is inserted into a document, it become completely static and it loses its intelligence through the link to the structured database being cut off. According to these approaches, if an object inserted into a contract from a structured data system is subsequently changed during a contract negotiation to the original parties dissatisfaction, that object must be manually changed back to its original value since it has lost all connection to the structured database system.

The inventors have solved this problem by using Smart Fields. Smart fields are specialized merge fields that retain the business management application's field definition even after document generation, wherein the retention of the field definition is accomplished by the business management application 110 add-in 115 flagging objects, i.e. text as subject to the Smart Field during an authoring session. As explained above, in some embodiments of the invention, each time a user logs in with his credentials, a session identifier is stored in the add-in 115. Accordingly, on a successive review of document with Smart Fields, the add-in 115 knows what data was flagged as being subject to the Smart Fields.

Referring again to FIG. 5A, Smart Fields can be inserted by clicking the menu Insert Smart Field from the intelligent document tab.

In some embodiments of the invention, the objects, i.e. text, contained within the Smart Fields appears exactly the same to an outside user. In fact, the outside user can change the text of the document despite the text originally being inserted from structured database system. The user of the add-in 115 may later see what changes the outside user made to the data in the Smart Fields by referring the session identifiers of past log-ins and accessing prior versions from the cloud.

In some embodiments of the invention, the add-in 115 is configured for flagging whole sections of a document as a Smart Field. These embodiments are particularly useful when working with contracts have discrete clauses.

Managing Agreements

In some embodiments of the invention, the add-in 115 allows users to generate business agreements in the document creation and word processing application 105 from the business management application 110 in the cloud-based structured database management system 120 by using and authoring templates, embedding merge fields/smart fields and clauses into a document. In some embodiments of the invention, once an agreement is generated, a word processing document is saved in as an attachment in the business management application 110 in the cloud-based structured database management system 120.

In some embodiments of the invention, the add-in 115 is configured for automatically recognizing a document type when a user opens a saved document. Upon recognizing a document type, the add-in is also configured for enables certain menus relating to tools that may be relevant to that particular document type.

Managing Versions

Very frequently, during the lifecycle of an agreement document, the document gets amended into one or more interim versions until the agreement is ready to be sent to a third party for review, an external party for review, or for final memorialization between signatories. Indeed, each of the parties involved in finalizing the document may make revisions. The external party will often send the agreement back for revisions and the document may go through the interim cycle again. Very often, the revisions are made using a word processing review tool (i.e. "Track Changes") that adds comments, redlines, etc. to the document that allow easier review by others. At some point once both parties have agreed upon the terms, the agreement is saved as a final version.

To accommodate the various stages of contract creation and negotiation, some embodiments of the invention, the business management application 110 allows, via the add-in 115, saving agreements in three different modes: with redlines; without redlines; and Final—To Be Signed.

Figure 4:
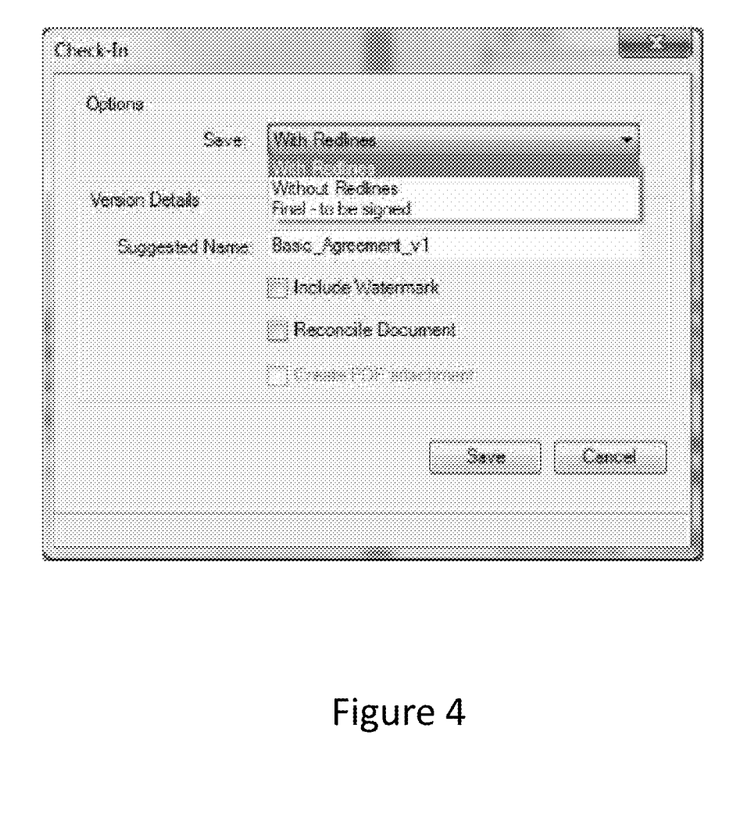
FIG. 4 illustrates an interface for checking-in an agreement according to some embodiments of the invention.

In some embodiments of the invention, every time an agreement document is saved in one of the above modes, the business management application 110 allows, via the add-in 115, automatically includes a version number to the agreement document which enables users to maintain multiple versions of the agreement document. In some embodiments of the invention, agreement documents can be saved into the cloud-based structured database management system 120 by clicking the "Check-In" menu in the "Versions" tab—See FIGS. 2A, 2B. FIG. 4 illustrates an interface for checking-in an agreement according to some embodiments of the invention.

As shown in FIG. 4, users are presented with a number of options when checking in an agreement including or removing a watermark, reconciling a document, and creating a portable version (i.e. .pdf) attachment.

In some embodiments of the invention, users can include a "DRAFT" watermark prior to checking the document into the cloud-based structured database management system 120. If the agreement document already contains a watermark, then the business management application 110 allows, via the add-in 115, automatically detects and changes the option to Remove Watermark.

In some embodiments of the invention, if a document contains Smart Fields, then the business management application 110 allows, via the add-in 115, automatically detects and allows users to reconcile the document prior to checking in the document—explained in greater detail below.

In some embodiments of the invention, when the "Final—to be signed" saved mode is selected, the business management application 110 allows, via the add-in 115, allows the user to save the version of the agreement document in portable version (i.e. .pdf) format. This .pdf document can be sent to external/third party for final signature without allowing the external/third party to substantively change the agreement terms.

Reconciliation

In a typical business scenario, when an agreement document is sent to third/external party for negotiation, the external party would make changes to the document as part of the negotiation. Sometimes the reviewing party would use a "track changes" feature; however, they may simply make changes without bringing those changes to the attention of the original author. Also, in a more nefarious scenario, the reviewing would use "track changes" for the majority of the changes and turn off the "track changes" feature when changing wording that he does not want the original author to notice. In these scenarios, it is difficult to go through a document to make sure that all changes are noticed and accounted for.

Additionally, prior to this invention, if changes to the document would involve data belonging to a structured data agreement record, there was no mechanism to get back the changes to the agreement record—apart from tedious and error-prone human data entry. Moreover, prior to this invention, if Smart Fields are used in a document, there is no way to reconcile datum changed in the Smart Field with the structured data agreement record.

Accordingly, some embodiments of the invention involve a reconciliation tool which guides users to track back the changes to certain fields marked as smart fields in the agreement record. In the presently preferred embodiments of the invention, the reconciliation tool is a reconciliation manager 116 comprising a processing module contained within the add-in 115.

In some embodiments of the invention, a reconciliation manager 116 allows users to reconcile smart fields in the negotiated agreement document. In the presently preferred embodiments of the invention, the reconciliation manager 116 validates each smart field against the smart field definition in cloud-based business management application 100. In some embodiments of the invention, the validations are performed for a variety of data types including data format, values against native data type, and validity of data for pick list data type.

Figure 6:
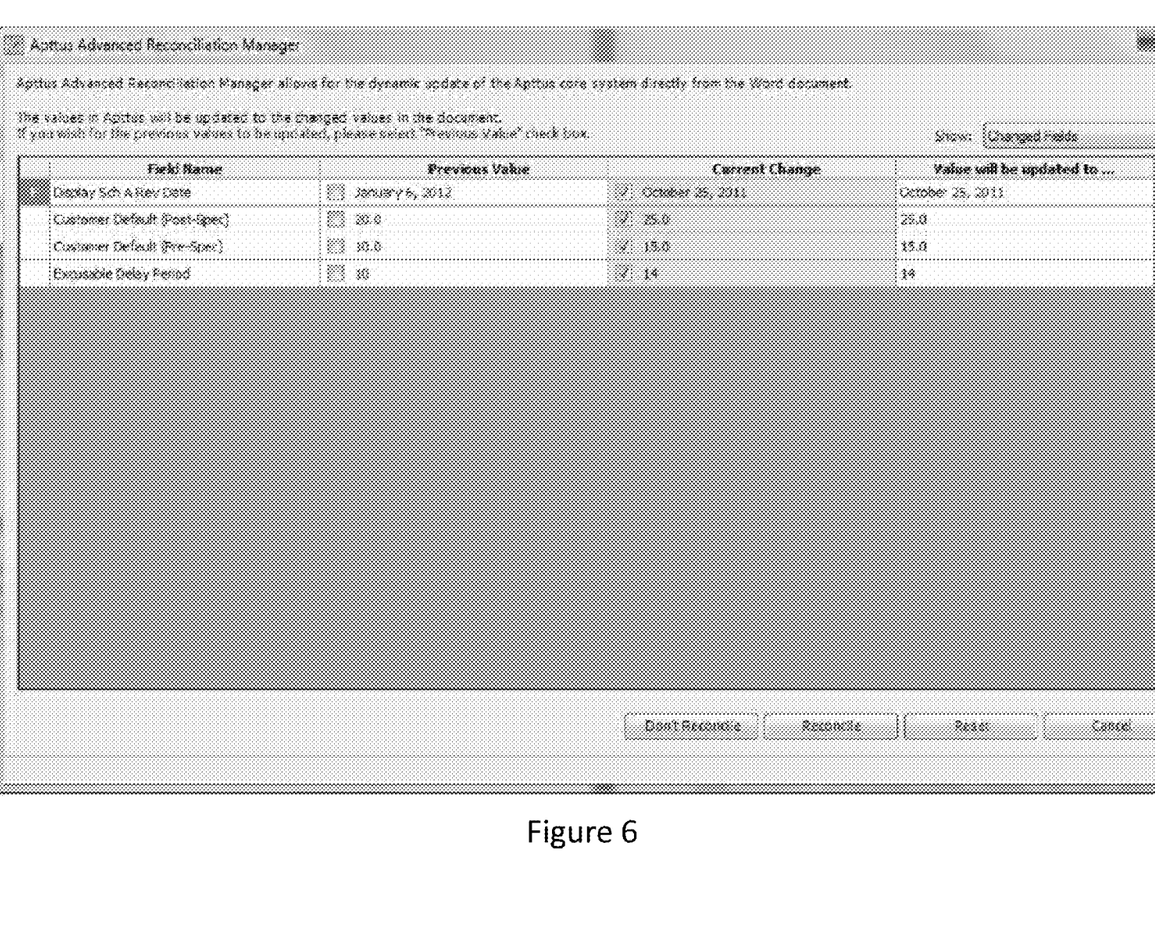
FIG. 6 illustrates a document highlighted with comments to indicate the presence of Smart Fields according to some embodiments of the invention.

FIG. 6 illustrates the user interface of a reconciliation manager 116 according to some embodiments of the invention. In some embodiments of the invention, the reconciliation manager is invoked by either by clicking the "Reconcile Document" menu from the Review tab (see FIG. 2A) or during the Check-In process.

According to FIG. 6, the "Previous Value" column contains the data in the various smart fields within the document at the time the document was generated or last saved as an external version. The "Current Change" column contains the proposed changes to the value of the various smart field data in the negotiated agreement document. This interface allows a user to perform a side-by-side comparison of the previous value and the current change in the negotiated agreement document.

Using an interface like that shown in FIG. 6, a user has an option either to perform reconciliation of the agreement document so that the agreement record will be updated with the changed values from the negotiated document or not to perform negotiation and the agreement document gets saved as is and no updates are done to the agreement record. In some embodiments of the invention, the reconciliation manager 116 allows users to confirm the changed values that he finds acceptable and reject those he finds unacceptable by reverting back to the original smart field values. In some embodiments of the invention, the reconciliation manager 116 shows those changes that were reverted back to the original smart field value in redline so the third party can see the reversions.

Figure 7:
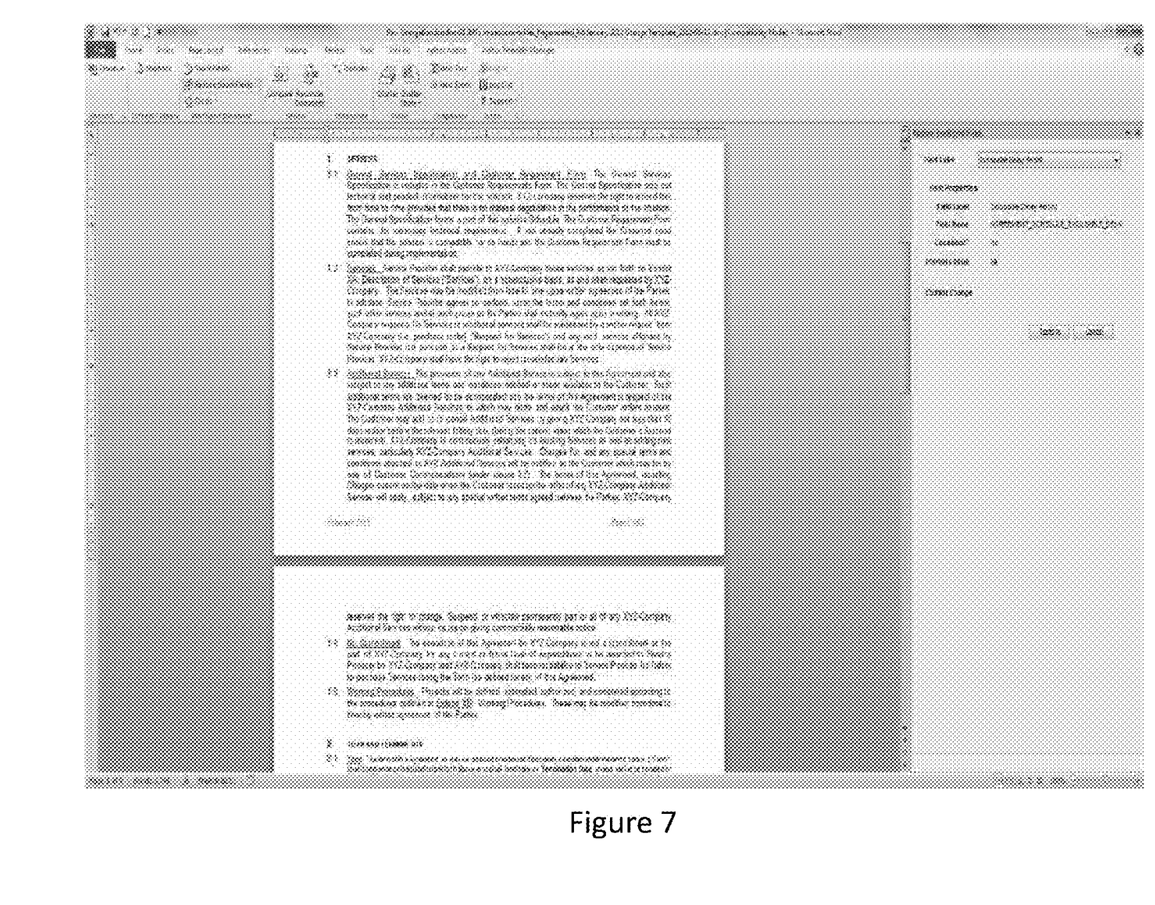
FIG. 7 illustrates a task pane user interface for restoring deleted smart fields according to some embodiments of the invention.

When a document iterates through the various negotiations, a user might have a difficult time recognizing the presence of smart fields. Accordingly, the business management application 110 allows, via the add-in 115, provides a mechanism to highlight smart fields in the document. In some embodiments of the invention, a "Smart Fields" menu from the Intelligent Document tab highlights the smart fields in a document if the intelligent fields are not already highlighted. In some embodiments of the invention, this highlighting uses built in "Track Changes" functionality of document creation and word processing application 105. For example, in some embodiments of the invention, the highlighting is created as a "Track Changes" comment. Optionally, the comment is tagged with initials indicating that the comments were performed by the add-in 115, rather than a human. FIG. 7 illustrates a document highlighted with comments to indicate the presence of Smart Fields according to some embodiments of the invention and redlined changes to the Smart Field values.

As explained herein, the reconciliation manager 116 allows users to reconcile smart fields in the negotiated agreement document. Additionally, the reconciliation manager 116 is also configured with the ability to detect deleted smart fields which could have been unknowingly deleted in the due course of negotiation. In some embodiments of the invention, detected deletions are able to be restored to match a previous version stored in the cloud.

In some embodiments of the invention, a "Restore Smart Fields" interface is accessed through an "Intelligent Document" tab in the ribbon menu of a document creation and word processing application 105. When this menu is clicked, the user is presented with the deleted smart fields list. In some embodiments of the invention, the add-in 115 loads an interface for the restoration of smart fields in a native word processing task pane, thereby providing an ability to perform a side-by-side view of the agreement document and restoring smart fields. FIG. 8 illustrates a task pane user interface for restoring deleted smart fields according to some embodiments of the invention.

Feedback Generation

In some embodiments of the invention, the add-in 115 is configured to allow users of a document creation and word processing application 105 the ability to attach rules and feedback notes to Smart Fields. For example, suppose a user of a word processing document creates a contract containing a particular clause that user considers non-negotiable. According to some embodiments of the invention, the add-in 115 allows this user to flag that clause as a Smart Field and, additionally, add a rule or feedback note to the flagged field. For example, the user can configure a particular clause to display a note (i.e. a "Track Changes" comment) when a third party reviewer attempts to change or delete the clause, informing the third party reviewer that his proposed action will not be an acceptable change from the author's standpoint.

In another example, suppose a user of a word processing document creates a contract containing a number of important dates for performance. According to some embodiments of the invention, the add-in 115 allows this user to flag the dates as Smart Fields and, additionally, add rules that would announce date and time conflicts if a third party reviewer changes a date that conflicts with another flagged date.

Business Transaction Analytics

Many companies are required to disclose and report financial information to government regulators and are required to have an Officer verify the veracity of the disclosures. Also many companies suffer from overpayments, duplicate payments, undetected losses, forgotten receivables, etc. Accordingly, some embodiments of the invention involve monitoring document versions, accounting with structured data values, and using the process of reconciliation to analyze the effectiveness of corporate transaction compliance measures.

Figure 8A:
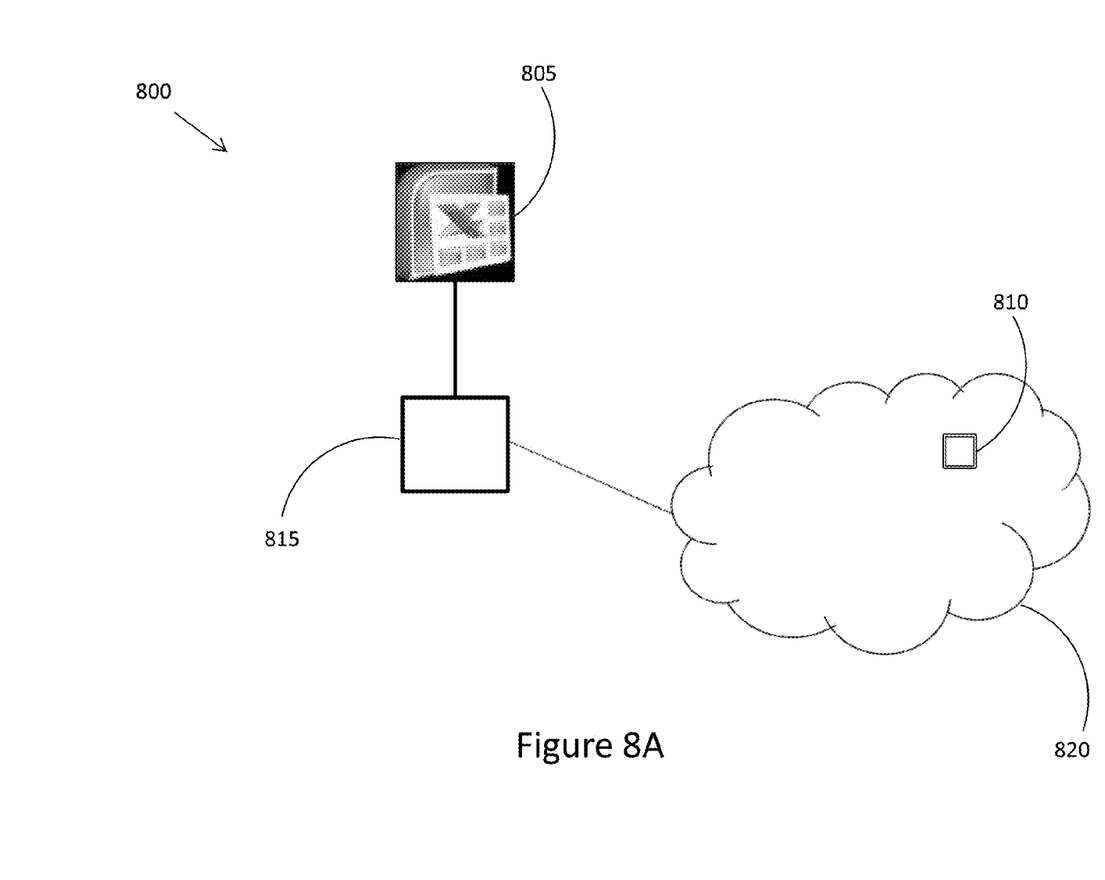
FIG. 8A illustrates a spreadsheet creation application with access to business management application according to some embodiments of the invention.

Some embodiments of the invention involve providing a spreadsheet creation application with access to business management application that is hosted on a cloud-based structured database management system or a behind the firewall application. FIG. 8A illustrates a spreadsheet creation application 805 with access to business management application 810 according to some embodiments of the invention.

In some embodiments, the business management application 810 is accessed by the spreadsheet creation application 805 through a managed add-in 815 that transfers web service calls to the spreadsheet creation application 810 via the structured database management system 820. Accordingly, a user accesses structured data from the structured database management system 820 as well as the business management application's 810 functionality via the spreadsheet creation application 805.

Figure 8B:
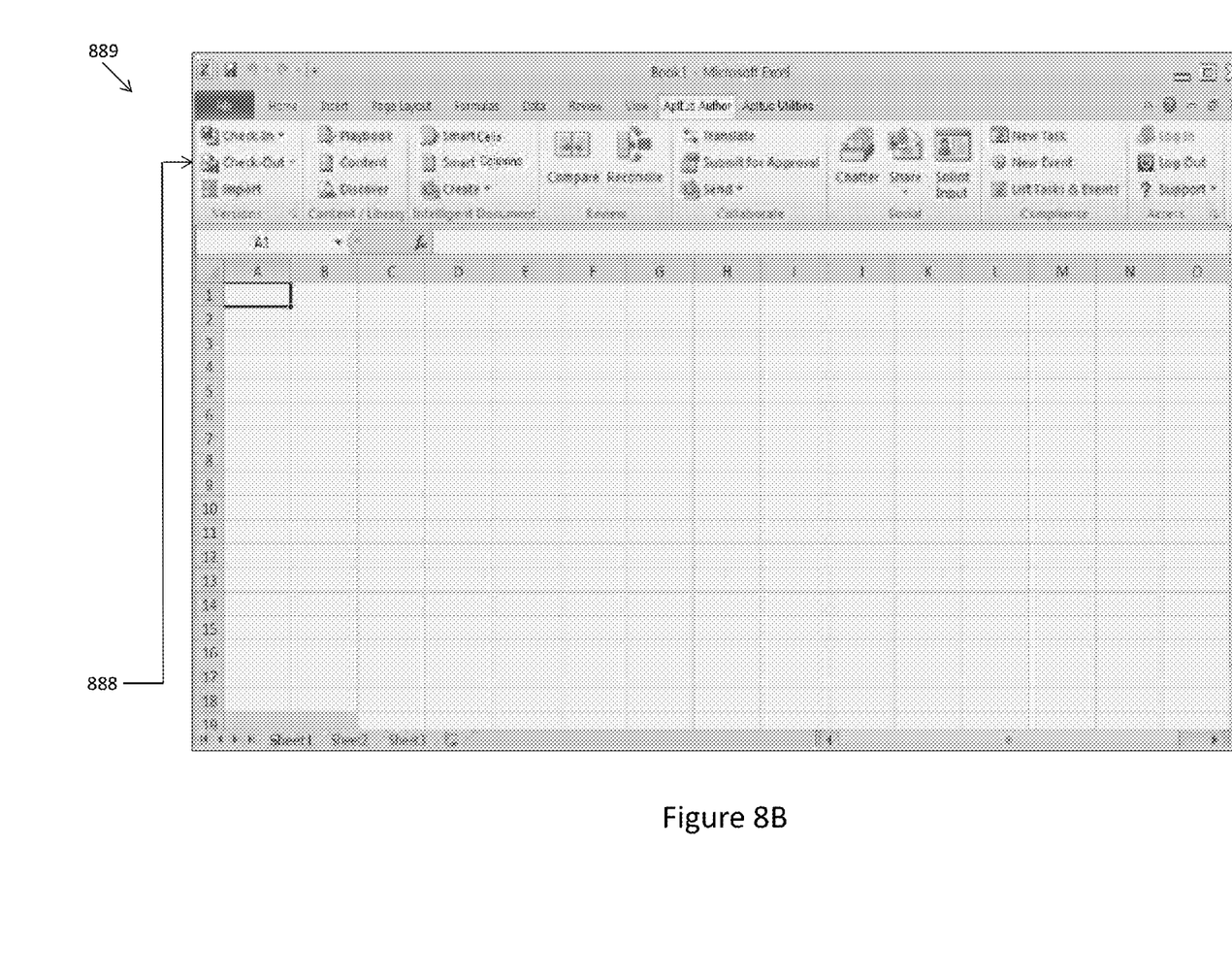
FIG. 8B illustrates an example of a spreadsheet application interface with an interactive ribbon menu for interacting with the business management application and the structured database management system via a document creation application according to some embodiments of the invention.

FIG. 8B illustrates an example of a spreadsheet application interface 899 with an interactive ribbon menu 898 for interacting with the business management application 810 and the structured database management system 820 via a document creation application 805 according to some embodiments of the invention. According to FIG. 8B, the interactive ribbon menu 898 includes a variety of tools for adding collaborative functionality and lifecycle management utility to a word processing document. For example, the tools include at least all of those disclosed above in connection with the document creation and processing application.

Implementation as a Machine

Figure 9:
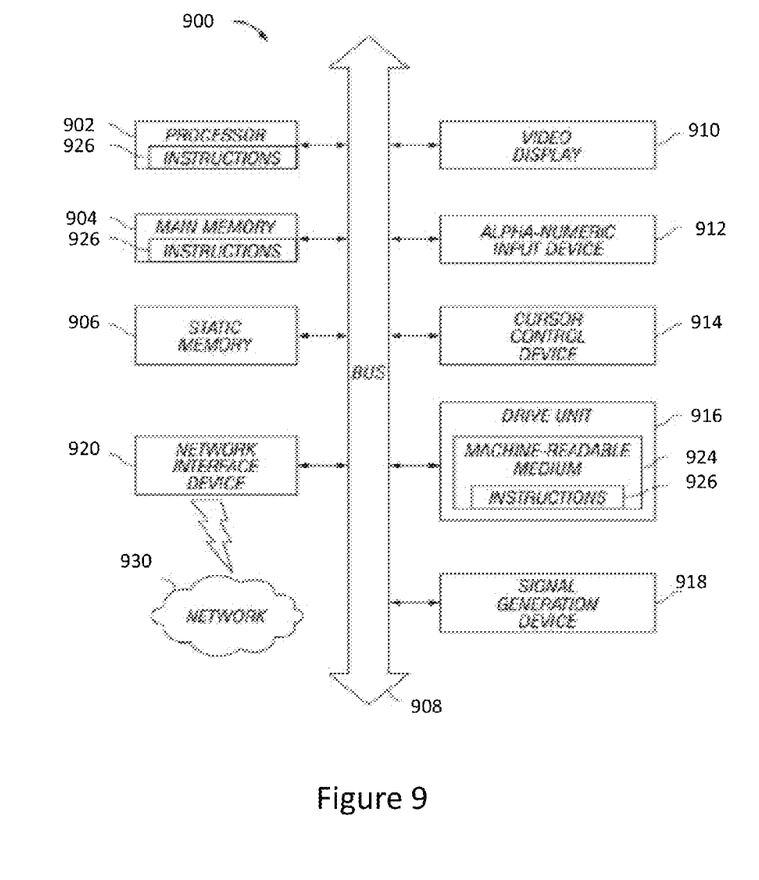
FIG. 9 is a block schematic diagram of a machine in the exemplary form of a computer system within which a set of instructions may be programmed to cause the machine to execute the logic steps of the invention.

FIG. 9 is a block schematic diagram of a machine in the exemplary form of a computer system 900 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a display unit 910, for example, a liquid crystal display (LCD) or a cathode ray tube (CRT). The computer system 900 also includes an alphanumeric input device 912, for example, a keyboard; a cursor control device 914, for example, a mouse; a disk drive unit 916, a signal generation device 918, for example, a speaker, and a network interface device 920.

The disk drive unit 916 includes a machine-readable medium 924 on which is stored a set of executable instructions, i.e. software, 926 embodying any one, or all, of the methodologies described herein below. The software 926 is also shown to reside, completely or at least partially, within the main memory 904 and/or within the processor 902. The software 926 may further be transmitted or received over a network 928, 930 by means of a network interface device 920.

In contrast to the system 900 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A computer-implemented method comprising:
via a computational device, configuring a document creation application with an add-in comprising instructions for linking said document creation application with a business management application that runs on a platform of a structured database management system and stores datum in said structured database management system;
via a computational device, configuring said add-in with a plurality of tools that, when executed, accesses utilities of said business management application via said document creation application without leaving an interface of said document creation application, wherein said plurality of tools comprises:
a check-in tool configured for allowing one or more end users to save one or more versions of a document on said platform;
a field definition tool that flags objects within said document as having a field value associated with said object; wherein the field definition tool is configured to define field values to correlate with database definitions used in said structured database management system; and to automatically populate said objects with data from said structured database management system when said field values match said database definitions; and
a reconciliation tool configured for comparing flagged objects in a document open in said document creation application against one or more versions of a document on said platform; wherein said reconciliation tool is further configured for presenting one or more differences between field values in the document open in said document creation application and field values in a version of a document on said platform to a user within the document creation application itself.

2. The computer-implemented method of claim 1, wherein said document creation application comprises a word processing application.

3. The computer-implemented method of claim 1, wherein said comparing comprises comparing data format.

4. The computer-implemented method of claim 1, wherein said comparing comprises comparing field values.

5. The computer-implemented method of claim 1, wherein said reconciliation tool is further configured for highlighting said flagged objects in a user interface of said document creation application to indicate the presence of an object having a field value.

6. The computer-implemented method of claim 5, wherein said reconciliation tool is further configured for, upon detecting one or more differences, providing said user with tools for performing each of:
changing field values in the document open in said document creation application to the field values of the version of a document on said platform; and
confirming the field value of one or more difference.

7. The computer-implemented method of claim 1, wherein said reconciliation tool is further configured for presenting one or more instances of deleted objects flagged with field values as compared to a document on said platform.

8. The computer-implemented method of claim 5, wherein said reconciliation tool is further configured for annotating objects flagged with field values with comments regarding said objects.

9. The computer-implemented method of claim 8, wherein said reconciliation tool is further configured for displaying said comments in a user interface within said document creation application when differences are found between a document open in said document creation application and a version of a document on said platform.

10. The computer-implemented method of claim 8, wherein said comments comprise annotations native to said document creation application.

11. A system comprising:
a non-transitory machine readable medium; and
instructions carried by the machine-readable medium and operable to cause a programmable processor to perform:
configuring a word processing application with an add-in comprising instructions for linking said word processing application with a contract management application that runs on a cloud-based platform of a structured database management system and stores datum in said structured database management system;
configuring said add-in with a plurality of tools that, when executed, accesses utilities of said contract management application via said document creation application without leaving an interface of said document creation application, wherein said plurality of tools comprise:
a check-in tool configured for allowing one or more end users to save a one or more versions of a document on said cloud-based platform;
a field definition tool that flags objects within said document as having a field value associated with said object, defines field values to correlate with database definitions used in said structured database management system, and automatically populates said objects with data from said structured database management system when said field values match said database definitions; and
a reconciliation tool configured for comparing flagged objects in a document open in said document creation application against one or more versions of a document on said cloud-based platform; wherein said reconciliation tool is further configured for (a) presenting one or more differences between field values in the document open in said word processing application and field values in a version of a document on said cloud-based platform to a user within the document creation application itself; (b) upon detecting one or more differences, providing said user with tools for performing each of: changing field values in the document open in said document creation application to the field values of the version of a document on said cloud-based platform; and confirming the field value of one or more difference; (c) annotating objects flagged with field values with comments regarding said objects, wherein said comments comprise annotations native to said document creation application.

12. The system of claim 11, wherein said comparing comprises comparing data format and comparing field values.

13. The system of claim 11, wherein said reconciliation tool is further configured for highlighting said flagged objects in a user interface of said document creation application to indicate the presence of an object having a field value.

14. The system of claim 11, wherein said reconciliation tool is further configured for presenting one or more instances of deleted objects flagged with field values as compared to a document on said cloud-based platform.

15. The system of claim 11, wherein said reconciliation tool is further configured for displaying said comments in a user interface within said document creation application when differences are found between a document open in said document creation application and a version of a document on said cloud-based platform.

\* \* \* \* \*